JOHN G. WILLIAMS
INVENTOR.
BY Daniel H. Botis
atty

United States Patent Office 2,921,533
Patented Jan. 19, 1960

2,921,533

HYDRODYNAMIC AND HYDROSTATIC BEARING

John G. Williams, Springfield, N.J., assignor to Worthington Corporation, Harrison, N.J., a corporation of Delaware Application March 30, 1956, Serial No. 575,114

1 Claim. (Cl. 103—111)

The present invention relates to a bearing for a rotatable shaft and more particularly to a hydrodynamic and hydrostatic bearing.

The present invention relates to a bearing for a pump which acts as a hydrodynamic type of bearing during starting conditions of the pump when the pressure available for the hydrostatic type of bearing would be very low and thereafter acts as a hydrostatic type bearing during normal operating conditions of the pump when forces from the pump are adequate for such type of bearing and when operating conditions for the lubricant are unsatisfactory for a hydrodynamic type bearing.

The bearing of the present invention is shown for purposes of illustration in use with a type of pump which is intended for service where the liquid being pumped serves as the bearing lubricant. This situation is common in pumps applied to pressurized water reactor service. In this particular instance, the pump is driven by some variable speed source, such as a multiple speed motor or a steam turbine. When starting, the temperature of the water would be low, possibly 100° F. but after the reactor reaches normal operating temperatures a water temperature in the vicinity of 500° F. is obtained. When starting the pump, the speed thereof is quite low and as the reactor reaches its normal operating temperature the pump speed increases accordingly to circulate water through the reactor at a greater rate. Because of these conditions, water properties such as viscosity and density which might be ideal for laminar flow conditions during the pump starting period and for a hydrodynamic type bearing are unacceptable for the usual hydrodynamic bearing designs after the pump reaches its normal operating temperature. However, as the reactor reaches normal load, the pump head is greatly increased and makes it possible to utilize this pressure to energize a hydrostatic type pump bearing.

In accordance with the present invention, a pump bearing is provided which operates first as a hydrodynamic type bearing during starting conditions of the pump and thereafter, when the speed of the pump reaches its normal operating range, and the water temperature and pump head is increased, acts as a hydrostatic type bearing using the water being pumped to energize this bearing. Thus, the present invention provides a bearing which first acts as a hydrodynamic bearing at low speed and thereafter as a hydrostatic bearing when the pump reaches its normal operating conditions without requiring an external pump or apparatus for supplying high pressure liquid lubricant to the bearing to energize it as a hydrostatic type bearing.

The present invention further provides a combination hydrodynamic and hydrostatic bearing for a pump without limiting the range of the pump design to limits wherein a hydrodynamic bearing only could be utilized.

The present invention will be better understood when considered in connection with the accompanying drawing forming a part thereof and in which.

Figures 1, 2, 3:
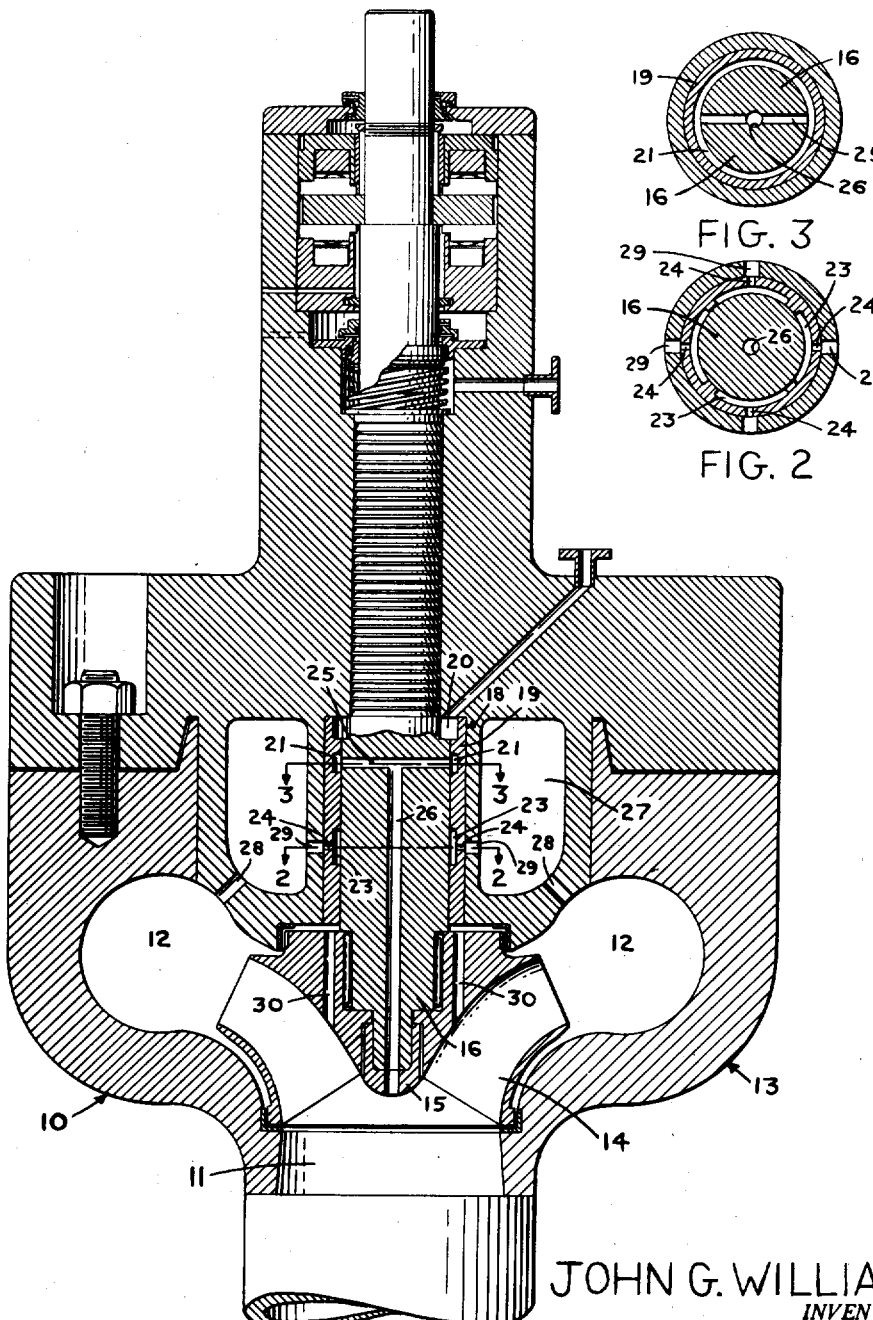
Figure 1 is a longitudinal sectional view of a centrifugal pump embodying the bearing of the present invention.
Figure 2 is a transverse section of the bearing taken on line 2—2 of Figure 1.
Figure 3 is a transverse section of the bearing taken on line 3—3 of Figure 1.

Referring to the drawing, the reference numeral 10 designates a centrifugal pump having an inlet or suction eye 11 and an outlet or discharge chamber 12 disposed in a housing or casing 13. An impeller 14 is provided in housing 13 and connected by a spline and a nut 15 to a rotatable vertical shaft 16 extending through the upper part of the housing. When shaft 16 is rotated by means, not shown, the impeller takes a suction through pump inlet eye 11 and discharges fluid therefrom into discharge chamber 12.

The hydrodynamic and hydrostatic bearing of the present invention generally designated 18 comprises a sleeve member 19 arranged on the lower end of shaft 16 and press fitted into a bore 20 in the housing 13. Member 19 is provided with a continuous circumferential recess 21 (Fig. 3) disposed on the inner surface thereof adjacent the upper end thereof and a plurality of circumferentially spaced recesses 23 (Fig. 2) on the lower end thereof. A restricted passage 24 is drilled in member 19 adjacent each recess 23 therein to form an orifice in communication with individual recesses for supplying high pressure lubricant to the bearing, as hereinafter described.

A transverse passage 25 is drilled through shaft 16 in communication at the opposite ends thereof with recess 21 while a vertical bore or passage 26 is provided in the lower end of shaft 16 to communicate at the upper end thereof with passage 25 and at the lower end thereof with suction eye 11. Passages 25 and 26 and vertical passages 30 extend through impeller 14 and are used to return lubricating liquid from bearing 18 to the suction inlet 11, as hereinafter described. A liquid containing annular chamber 27 is provided in housing 13 adjacent bearing 18 and communicates with discharge chamber 12 through a plurality of inlet passages 28 and with orifices 24 through discharge passages 29 disposed therein adjacent the recesses.

In operation, when pump 10 is initially placed in operation the temperature of the water being pumped is low, for example, approximately 100° F., the pump speed is low, and the discharge pressure or head is also low. The pump impeller 14 takes a suction through inlet eye 11 and discharges liquid therefrom into discharge chamber 12, a portion of the liquid thereafter passing through inlet passages 28, chamber 27, outlet passages 29 and orifices 24 into recess 23 of the bearing. At this time, pump shaft 16 may impose a load on bearing 18 due to unbalance and/or dead weight. Bearing 18 acts as a hydrodynamic bearing with this action, and the lubricating water entering recess 23 forms a wedge-shaped film between the bearing and shaft due to well known laws pertaining to viscous flow. The lubricating water then passes upwardly and downwardly of the bearing providing lubricating action between the shaft and bearing surfaces. The portion of lubricating liquid which flows upwardly from recess 23 thereafter passes into recess 21 in the upper portion of bearing 18 from which it is discharged through passages 25 and 26 back to the suction inlet 11 of the pump while the portion of lubricating liquid passing downwardly from recess 23 flows through passages 30 to the pump inlet eye.

When the speed of the pump has increased to its normal operating range and the temperature of the water being pumped increases to its normal operating temperature, for example, 500° F., the discharge pressure or pump head increases so that it is possible to utilize the water pressure to operate bearing 18 as a hydrostatic bearing. Furthermore, when these conditions are obtained the properties of the water being pumped (especially viscosity) are unacceptable for the usual hydrodynamic bearing. At this time the high pressure of the water passing from chamber 27 through passages and orifices 24 imposes a force on shaft 16 acting in a radial direction thereon so as to center the shaft concentrically within bearing sleeve member 19 and thereby prevents the shaft from acting against one surface or portion of the bearing member. The lubricating water passing between the shaft and bearing surfaces thereafter flows upwardly and downwardly of the bearing and is returned to the suction eye or inlet 11 in the same manner as when the bearing was acting as a hydrodynamic bearing. Thus, the present invention provides a bearing for a pump shaft which acts as a hydrodynamic type bearing at low speed and temperature when the pump head is low, and thereafter acts as a hydrostatic type bearing when the pump speed, water temperature and pump head increases.

It will be understood that the invention is not to be limited to the specific construction or arrangement of parts shown but that they may be widely modified within the invention defined by the claim.

What is claimed is:

In combination, a pump comprising a housing having an inlet therein, a rotatable shaft in said housing, an impeller connected to said shaft, an annular discharge chamber in communication with the impeller for receiving liquid under pressure therefrom, a shaft bearing disposed in said housing to act as a hydrodynamic bearing when the pump is operating at low speed and as a hydrostatic bearing when the pump is operating at normal speed, said bearing comprising a sleeve member mounted on the shaft adjacent said impeller and having a continuous circumferential recess on the inner surface thereof adjacent its upper end and spaced circumferential recesses below said continuous recess whereby said bearing is characterized as having a plurality of ridges having greater surface area adjacent said shaft than the surface area of said recesses adjacent said shaft, a restricted passage in the sleeve member forming an orifice in communication with each spaced recess, an annular liquid chamber in said housing disposed adjacent the outside of said bearing having an inlet in communication with said discharge chamber and outlets in communication with said orifices to pass lubricating liquid to the bearing surface, a passageway in said shaft and impeller in communication with said continuous recess and pump inlet, and passages extending through said impeller in communication with the inner end of said bearing and pump inlet for returning lubricating liquid to the pump inlet.

References Cited in the file of this patent

UNITED STATES PATENTS

| | | |
|---|---|---|
| 846,795 | Kruesi | Mar. 12, 1907 |
| 1,721,738 | Kendall | July 23, 1929 |
| 1,942,101 | Howarth | Jan. 2, 1934 |
| 2,632,395 | Jennings et al. | Mar. 24, 1953 |
| 2,669,187 | Guyer | Feb. 16, 1954 |
| 2,684,034 | Roth | July 20, 1954 |
| 2,696,410 | Topanelian, Jr. | Dec. 7, 1954 |
| 2,704,516 | Mock et al. | Mar. 22, 1955 |

FOREIGN PATENTS

| | | |
|---|---|---|
| 425,736 | Germany | Feb. 23, 1926 |
| 1,088,917 | France | Sept. 22, 1954 |